C. L. LINCOLN.
BRAKE.
APPLICATION FILED DEC. 28, 1910.
1,003,621.
Patented Sept. 19, 1911.
2 SHEETS—SHEET 1.
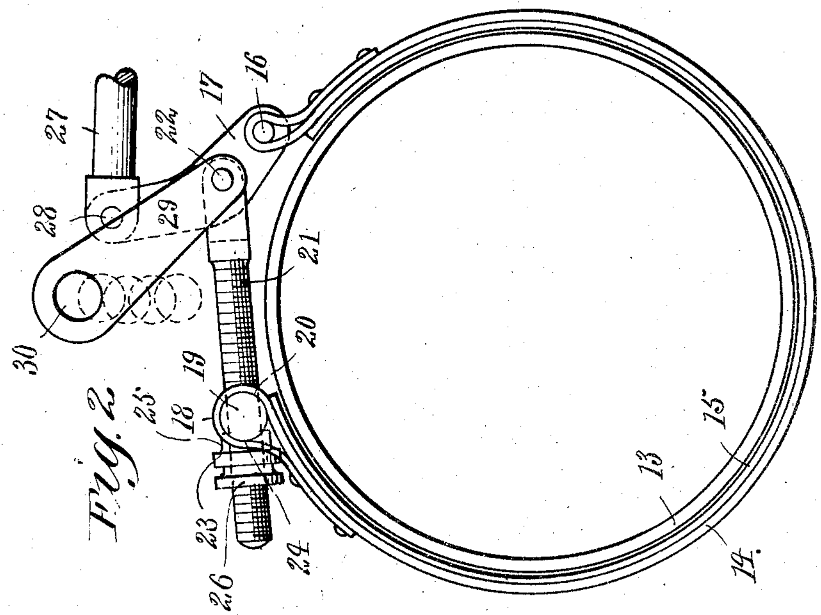
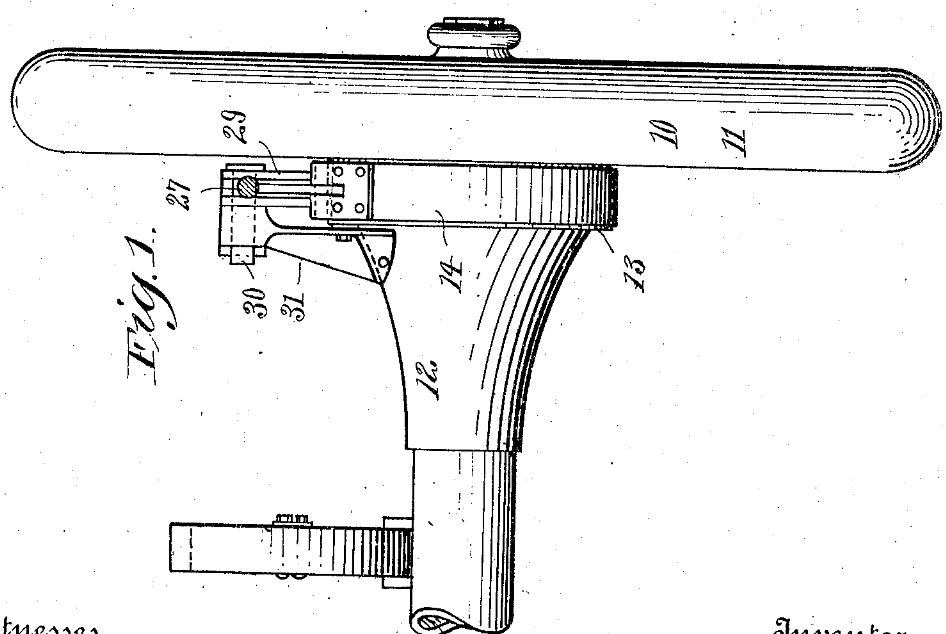
Witnesses
L. Cloud Newman.
Ivan L. Morehouse
Inventor
Charles L. Lincoln
By Christian M. Newman
for Chamberlain & Newman Attorneys C. L. LINCOLN.
BRAKE.
APPLICATION FILED DEC. 28, 1910.
1,003,621.
Patented Sept. 19, 1911.
2 SHEETS—SHEET 2.
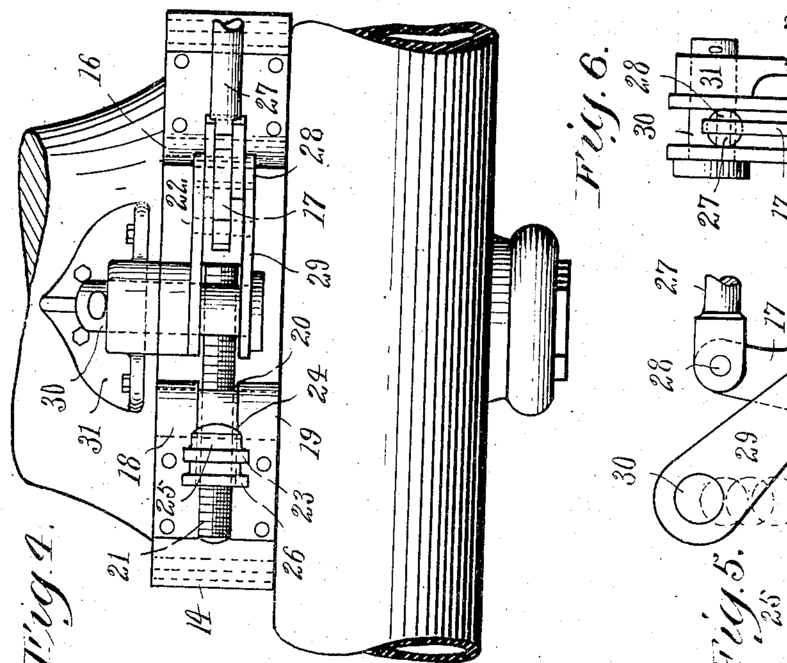
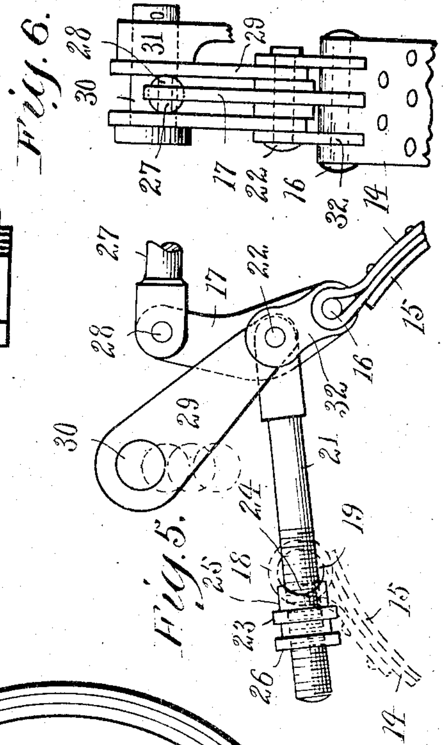
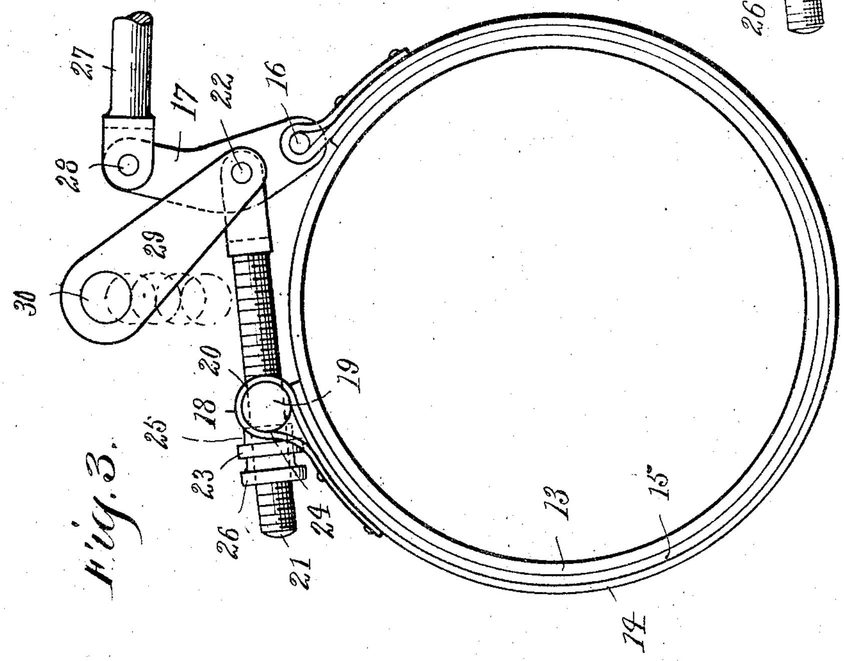
Witnesses
L. Claud Newman.
Ivan L. Morehouse
Inventor
Charles L. Lincoln
By Christian M. Newman
for Chamberlain & Newman Attorneys

UNITED STATES PATENT OFFICE.

CHARLES L. LINCOLN, OF BRIDGEPORT, CONNECTICUT, ASSIGNOR OF ONE-HALF TO SAMUEL H. WHEELER, OF BRIDGEPORT, CONNECTICUT.

BRAKE.

1,003,621. Specification of Letters Patent. Patented Sept. 19, 1911.

Application filed December 28, 1910. Serial No. 599,741.

*To all whom it may concern:*

Be it known that I, CHARLES L. LINCOLN, a citizen of the United States, and resident of Bridgeport, in the county of Fairfield and State of Connecticut, have invented certain new and useful Improvements in Brakes, of which the following is a specification.

My invention relates to new and useful improvements in brakes and particularly to external band brakes such as are used upon automobile and other like road vehicles.

The particular object of the invention is to generally improve upon the construction, and manner of arranging and connecting the links and other parts whereby a more effective form of brake is produced; to design the parts so as to get a uniform and equal pressure or draft upon both ends of the brake band when applied, irrespective of whether the machine be moving in a forward or backward direction, and further to obtain these results in a prompt and effective manner thus avoiding any back lash, jerking and noise when the brake is applied, such as is present in slotted link, and other forms of constructions, and finally to make all operative parts adjustable with respect to the fixed parts and so arranged with respect to each other that a direct wrapping effect in both directions of the brake band upon the drum is obtained. It will be further noted that the brake is exceptionally simple in construction and thus inexpensive to manufacture, also that the parts are so arranged and connected as to permit of their being quickly and easily removed or replaced should it become necessary to repair the brake.

With these and other objects in view the invention consists in the construction and novel combination and arrangement of parts hereinafter fully described, and illustrated in the accompanying two sheets of drawings, and pointed out in the claims hereto appended, it being understood that various changes in the form, proportion, size, and minor details of construction within the scope of the claims may be resorted to without departing from the spirit or sacrificing any of the advantages of the invention.

Similar characters of reference denote like or corresponding parts throughout the several figures of the accompanying drawings forming a part of this specification, and upon which, Figure 1, shows a front elevation of an automobile axle and wheel with my improved form of external band brake applied thereto. Fig. 2, is an enlarged inside elevation of brake, drum, and connecting mechanism shown in Fig. 1. Fig. 3, is a similar side view of my novel brake mechanism, but with parts in a tightened or clamped position. Fig. 4, is a further enlarged plan view of the brake mechanism shown in Fig. 1. Figs. 5 and 6 show a detached side and edge view respectively of a reinforced form of my invention including a couple of extra links to strengthen the device as might be required on extra wide brake drums.

Referring in detail to the characters of reference marked upon the drawings 10 indicates a wheel that is connected and designed to be driven by an axle journaled in the fixed casing 12. The brake drum 13 is secured to the wheel in the usual or any preferred manner and is finished with a peripheral cylindrical brake surface which is encircled by a brake band 14 that has secured to its inner side a suitable asbestos or other form of brake lining 15 to engage the peripheral surface of the brake drum. The forward end of the brake band is turned back and riveted to the body of the band to form an eye through which a stud 16 is placed for the connection of one end of an operating lever 17. A somewhat larger eye 16 is similarly formed by the opposite end of the brake band for its attachment to a stud 19. This stud is provided with a transverse hole 20 therethrough to receive the threaded end of an adjustable bolt 21. The head end of this bolt is slotted to receive the intermediate portion of the before mentioned lever 17 and is further provided with a transverse hole to receive a pivotal pin 22 by means of which it is pivotally connected to the said lever. The threaded end of the bolt is provided with an adjusting nut 23 to engage the cross stud and it contains two concave pockets 24 formed in the opposite sides of its forwardly extended sleeve portion 25, to receive the rounded side of the stud in a way to prevent the nut from turning off. A second or lock nut 26 is also placed upon the threaded end of the bolt and in practice is set up against the first nut 23 to further prevent it from turning off. This bolt is made adjustable so as to lengthen or shorten the distance between the ends of the brake band and thus adjust the band to the drum as occasion may require. The connecting rod 27 for operating the brake is pivotally connected to the outer end of the lever 17 by means of a pin 28. A pair of links 29—29 which are pivotally connected to a fixed stud 30 are also pivotally connected to the pin 22 which as before stated also serves to pivotally unite the lever and free end of the bolt. The fixed stud may be supported in a bracket 31 carried by the axle covering, or may be supported from any other fixed part of the running gear. This stud may further be made adjustable so as to set the mechanism higher or lower, better to accommodate different sized brakes. The operative parts of the brake are thus made self adjusting, that is, they are so hung from the fixed stud, as to be operatively retained in position and to cause the band and connected parts to assume a proper position to take immediate hold of the drum as quick as the lever is operated, and particularly to apply the power so that both ends of the band are tightly drawn against the drum and toward each other and thus closely applied to the surface of the drum. When the rod and lever are operated to tighten the band and clamp the drum the lever assumes an upright position and slightly raises the relative position of pivotal pin and causes the stud end 16 of the band to engage the drum equally with the other end thereby causing an equal amount of wear upon all the parts.

On extra wide brakes when additional strength is required I provide an extra pair of short links 32—32, see Figs. 5 and 6, intermediate of the pin 16 and the pin 22 which stiffens and strengthens the connection.

Having thus described my invention what I claim and desire to secure by Letters Patent is,

1. In a brake of the class described, the combination with a drum, and a fixed support, of a brake band to encircle the drum, a stud carried by one end of the band, a bolt adjustably mounted in the stud, a link one end of which is pivotally mounted upon the support and the other end pivotally connected to the free end of the bolt, an operating lever one end of which is pivotally connected to the other end of the brake band and its intermediate portion pivotally connected to the ends of both the before mentioned bolt and link, and an operating rod pivotally connected to the other end of the said lever.

2. In a brake of the class described, the combination with a drum, and a fixed support, of a brake band to encircle the drum, a stud carried by one end of the band, a bolt mounted in the stud, a nut upon the bolt having pockets in its side to receive the side of the stud and hold the nut against turning, a link one end of which is pivotally mounted upon the support and the other end pivotally connected to the free end of the bolt, an operating lever one end of which is pivotally connected to the other end of the brake band and its intermediate portion pivotally connected to the ends of both the before mentioned bolt and link, and an operating rod pivotally connected to the other end of the said lever.

3. In a brake of the class described, the combination with a drum, and a fixed support, of a brake band to encircle the drum, a stud carried by one end of the band, a bolt having one end adjustably mounted in the stud, an operating lever one end of which is pivotally connected to the brake band and its intermediate portion pivotally connected to the other end of the bolt, a link pivotally hung from the fixed support and pivotally connected to said intermediate portion of the operating lever, and means for operating the lever to set the brake band.

Signed at Bridgeport in the county of Fairfield and State of Connecticut this 2nd day of Dec. A. D., 1910.

CHARLES L. LINCOLN.

Witnesses:

C. M. NEWMAN,

RUTH M. WORDEN.